(12) United States Patent
Nakazawa et al.

(10) Patent No.: US 12,046,065 B2
(45) Date of Patent: Jul. 23, 2024

(54) INFORMATION PROCESSING SYSTEM, INFORMATION PROCESSING METHOD, AND INFORMATION STORAGE MEDIUM

(71) Applicant: RAKUTEN GROUP, INC., Tokyo (JP)

(72) Inventors: Mitsuru Nakazawa, Tokyo (JP); Takashi Tomooka, Tokyo (JP)

(73) Assignee: RAKUTEN GROUP, INC., Tokyo (JP)

( * ) Notice: Subject to any disclaimer, the term of this patent is extended or adjusted under 35 U.S.C. 154(b) by 433 days.

(21) Appl. No.: 17/358,023

(22) Filed: Jun. 25, 2021

(65) Prior Publication Data

US 2022/0171966 A1    Jun. 2, 2022

(30) Foreign Application Priority Data

Nov. 27, 2020 (JP) .................................. 2020-196845

(51) Int. Cl.
*G06V 30/413* (2022.01)
*G06F 40/30* (2020.01)
*G06Q 30/0601* (2023.01)
*G06V 30/19* (2022.01)

(52) U.S. Cl.
CPC ............ *G06V 30/413* (2022.01); *G06F 40/30* (2020.01); *G06Q 30/0623* (2013.01); *G06V 30/19* (2022.01)

(58) Field of Classification Search
CPC ... G06V 30/413; G06F 40/30; G06Q 30/0623
See application file for complete search history.

(56) References Cited

U.S. PATENT DOCUMENTS

| | | | |
|---|---|---|---|
| 10,032,072 B1* | 7/2018 | Tran | G06F 18/28 |
| 10,496,884 B1* | 12/2019 | Nguyen | G06V 30/413 |
| 11,886,494 B2* | 1/2024 | Chang | G06N 3/08 |
| 2009/0138797 A1* | 5/2009 | Listou | G06F 40/10 |
| | | | 715/236 |
| 2016/0225064 A1 | 8/2016 | Matsui et al. | |
| 2018/0285778 A1* | 10/2018 | Nori | G06F 18/254 |
| 2019/0042574 A1* | 2/2019 | Kim | G06F 18/41 |
| 2020/0104241 A1* | 4/2020 | Talukdar | G06F 11/3684 |
| 2021/0004589 A1* | 1/2021 | Turkelson | G06V 30/19173 |
| 2021/0166400 A1* | 6/2021 | Goel | G06V 10/7747 |

(Continued)

FOREIGN PATENT DOCUMENTS

| | | |
|---|---|---|
| CN | 105993029 A | 10/2016 |
| JP | 2014-115912 A | 6/2014 |
| JP | 2019008684 A | 1/2019 |

OTHER PUBLICATIONS

Office Action of Feb. 1, 2022, for corresponding JP Patent Application No. 2020-196845 with partial English translation, pp. 1-3.

*Primary Examiner* — Kevin Ky
(74) *Attorney, Agent, or Firm* — HEA LAW PLLC

(57) ABSTRACT

An information processing system configured to provide an electronic commerce platform. An information processing system is configured to acquire a descriptive text related to an item and at least one image related to the item; identify an object from the descriptive text; detect an object from each of the at least one image; and generate correspondence information based on correspondence between the object identified from the descriptive text and the object detected from the image.

12 Claims, 15 Drawing Sheets

(56) References Cited

U.S. PATENT DOCUMENTS

| | | | |
|---|---|---|---|
| 2021/0263962 A1* | 8/2021 | Chang | G06F 18/2431 |
| 2021/0264210 A1* | 8/2021 | Ueta | G06F 18/2148 |
| 2021/0279527 A1* | 9/2021 | Zadeh | G06F 18/2178 |
| 2022/0036693 A1* | 2/2022 | Zhang | G06V 20/40 |
| 2022/0130499 A1* | 4/2022 | Zhou | G06V 10/25 |
| 2022/0171966 A1* | 6/2022 | Nakazawa | G06F 40/30 |
| 2022/0301315 A1* | 9/2022 | Okada | G06V 20/58 |

* cited by examiner

FIG.6

| No | SENTENCE INCLUDED IN DESCRIPTIVE TEXT | OBJECT WORD | PART WORD |
|---|---|---|---|
| 1 | THERE IS A WARRANTY. | WARRANTY | — |
| 2 | EARPHONES HAVE DIRT ON THE FRONT SURFACE. | EARPHONES | FRONT SURFACE |
| 3 | SCRATCHES ARE SEEN ON THE BACK SIDE. | SMARTPHONE | BACK SIDE (BACK SURFACE) |
| 4 | THERE IS NO CHARGE ADAPTER AS AN ACCESSORY. | — | — |

FIG.7

| IMAGE | DETECTED OBJECT | PHOTOGRAPHED PORTION |
|---|---|---|
| IMAGE 1 | SMARTPHONE | FRONT |
| IMAGE 2 | CHARGE ADAPTER | — |
| | BOX | SIDE |
| IMAGE 3 | DOCUMENT | FRONT |

FIG.12

THE ITEM DESCRIPTIVE TEXT INCLUDES A SENTENCE OF "EARPHONES HAVE DIRT ON THE FRONT SURFACE," BUT NO "EARPHONES" WERE DETECTED FROM THE IMAGE. WOULD YOU NEWLY PHOTOGRAPH EARPHONES?

THE ITEM DESCRIPTIVE TEXT INCLUDES A SENTENCE OF "SCRATCHES ARE SEEN ON THE BACK SIDE." THE FIRST IMAGE SEEMS TO BE A "SMARTPHONE", BUT THE PHOTOGRAPHED PART SEEMS TO BE THE "FRONT". WOULD YOU ALSO PHOTOGRAPH THE "BACK"?

INFORMATION PROCESSING SYSTEM, INFORMATION PROCESSING METHOD, AND INFORMATION STORAGE MEDIUM

CROSS-REFERENCE TO RELATED APPLICATION

The present application claims priority from Japanese application JP 2020-196845 filed on Nov. 27, 2020, the content of which is hereby incorporated by reference into this application.

FIELD OF THE INVENTION

The present invention relates to an information processing system, an information processing method, and an information storage medium.

BACKGROUND OF THE INVENTION

Electronic commerce includes a service of selling items, for example, secondhand items. In such a service, a seller inputs an image and a descriptive text about an item. The image and the descriptive text are displayed when a purchaser accesses a webpage of the item, and the purchaser considers whether to purchase the item based on the image and the descriptive text.

In JP2014-115912A, there is disclosed a system configured to search for, based on an item image received from a seller, from among images of items purchased in the past by the seller, a similar image similar to the item image, and to generate a selling page including item information corresponding to the retrieved similar image.

SUMMARY OF THE INVENTION

In some cases, the contents of the descriptive text and the image do not exactly correspond to each other, and thus the description of the item is confusing. For example, in a case in which there is no image of a portion referred to in the descriptive text due to a user's mistake, and in a case in which it is difficult to grasp which image is described by the descriptive text, there is a fear in that the description of the item becomes confusing. In such cases, a burden on a user as a buyer to grasp the item from the descriptive text and the image is increased.

The present invention has been made in view of the above-mentioned problem, and has an object to provide a technology for allowing a user to more easily grasp an item from a descriptive text and an image.

In order to solve the above-mentioned problem, according to at least one embodiment of the present invention, there is provided an information processing system configured to provide an electronic commerce platform, the information processing system including: an acquiring unit configured to acquire a descriptive text related to an item and at least one image related to the item; an identifying unit configured to identify an object from the descriptive text; a detection unit configured to detect an object from each of the at least one image; and a correspondence unit configured to generate correspondence information based on correspondence between the object identified from the descriptive text and the object detected from the image.

Further, according to at least one embodiment of the present invention, there is provided an information processing method for providing an electronic commerce platform, the information processing method including: acquiring a descriptive text related to an item and at least one image related to the item; identifying an object from the descriptive text; detecting an object from each of the at least one image; and generating correspondence information based on correspondence between the object identified from the descriptive text and the object detected from the image.

Further, according to at least one embodiment of the present invention, there is provided a program for causing a computer to function as: an acquiring unit configured to acquire a descriptive text related to an item to be handled in an electronic commerce platform and at least one item image related to the item; an extracting unit configured to extract at least one description target from the descriptive text; an identifying unit configured to identify an object from the descriptive text; a detection unit configured to detect an object from each of the at least one image; and a correspondence unit configured to generate correspondence information based on correspondence between the object identified from the descriptive text and the object detected from the image.

In at least one embodiment of the present invention, the identifying unit may be configured to identify, from the descriptive text, a referring portion related to a part of the object, the detection unit may be configured to detect an object and a photographed portion of the object from each of the at least one image, and the correspondence unit may be configured to generate the correspondence information based on correspondence between the referring portion of the object identified by the identifying unit and the photographed portion of the object detected by the detection unit.

In at least one embodiment of the present invention, the correspondence unit may be configured to generate correspondence information including information representing, among objects identified from the descriptive text, an object having no correspondence to any object detected from the image.

In at least one embodiment of the present invention, the correspondence unit may be configured to generate correspondence information including information representing, among referring portions of objects identified from the descriptive text, a referring portion having no correspondence to any photographed portion of the object detected from the image.

In at least one embodiment of the present invention, the information processing system may further include a display control unit configured to command that a notification for urging a user to add an image is displayed, based on the correspondence information.

In at least one embodiment of the present invention, the correspondence unit may be configured to generate correspondence information representing correspondence between an object detected from the image and a sentence, which is included in the descriptive text, and which includes an object corresponding to the detected object and being identified from the descriptive text, and the information processing system may further include a display control unit configured to command that the sentence corresponding to an object included in an image pointed by a user is displayed, based on the correspondence information.

In at least one embodiment of the present invention, the display control unit may be configured to command that the sentence corresponding to an object pointed by the user in the image is displayed.

According to the at least one embodiment of the present invention, the user can more easily grasp an item from the descriptive text and the image.

BRIEF DESCRIPTION OF THE DRAWINGS

FIG. 6 is a table for showing examples of a sentence included in the descriptive text, and an object word and a part word identified from the sentence.

FIG. 7 is a table for showing an object and a photographed portion to be detected from an image.

FIG. 12 is a view for illustrating examples of a message to be generated.

DETAILED DESCRIPTION OF THE INVENTION

Now, at least one embodiment of the present invention is described with reference to the drawings. Redundant description of configurations denoted by the same reference symbols is omitted. In the at least one embodiment, description is given of an information processing system configured to acquire an image and a descriptive text about an item from a user (seller) selling the item, check the input image and descriptive text, and present an item description page using the image and the descriptive text to a user as a buyer (purchase candidate). The information processing system is, for example, a secondhand item selling system configured to sell secondhand items.

Figure 1:
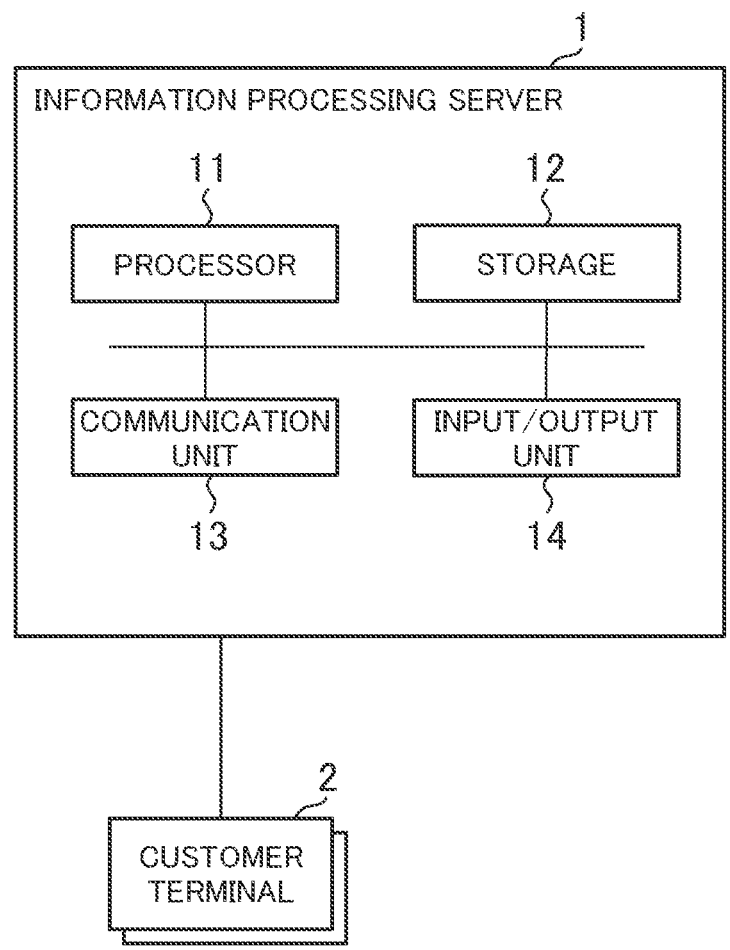
FIG. 1 is a diagram for illustrating an example of an information processing system according to at least one embodiment of the present invention.

FIG. 1 is a diagram for illustrating an example of the information processing system according to the at least one embodiment of the present invention. The information processing system includes an information processing server 1 and at least one customer terminal 2. The customer terminal 2 is, for example, a smartphone or a personal computer, and is to be operated by a user (seller or purchase candidate) of a service provided by the information processing system.

The information processing server 1 is configured to communicate with the at least one customer terminal 2, receive description information on an item and at least one image related to the item from the customer terminal 2 operated by a user being a seller, and register the description information and the image(s) in the service. Further, the information processing server 1 is configured to present the description information and the image(s) to a user being a purchase candidate. The description information is information for describing the item sold by the seller, and includes, for example, a descriptive text of the item, information related to a price, information representing a type of the item, and information on purchase time. The type of the item refers to, for example, a manufacturer or a product name.

The information processing server 1 includes a processor 11, a storage 12, a communication unit 13, and an input/output unit 14. The server 1 is a server computer. Processing of the information processing server 1 may be implemented by a plurality of server computers.

The processor 11 is configured to operate in accordance with a program stored in the storage 12. The processor 11 is also configured to control the communication unit 13 and the input/output unit 14. The above-mentioned program may be provided through, for example, the Internet, or may be provided by being stored and provided in a flash memory, a DVD-ROM, or another computer-readable storage medium.

The storage 12 is formed of memory devices, such as a RAM and a flash memory, and an external storage device, such as a hard disk drive. The storage 12 is configured to store the above-mentioned program. The storage 12 is also configured to store information and calculation results that are input from the processor 11, the communication unit 13, and the input/output unit 14. The storage 12 may store the received description information and plurality of images. Further, a storage different from that of the information processing server 1 may be provided in order to store the received description information and plurality of images.

The communication unit 13 implements a function of communicating with another device, and is formed of, for example, an integrated circuit for implementing a wireless LAN or a wired LAN. Under control of the processor 11, the communication unit inputs information received from another device to the processor 11 and the storage 12, and transmits information to another device.

The input/output unit 14 is formed of, for example, a video controller configured to control a display output device and a controller configured to acquire data from an input device. Examples of the input device include a keyboard, a mouse, and a touch panel. The input/output unit 14 is configured to output display data to the display output device under the control of the processor 11, and to acquire data input by the user operating the input device. The display output device is, for example, a display device connected to the outside.

Figure 2:
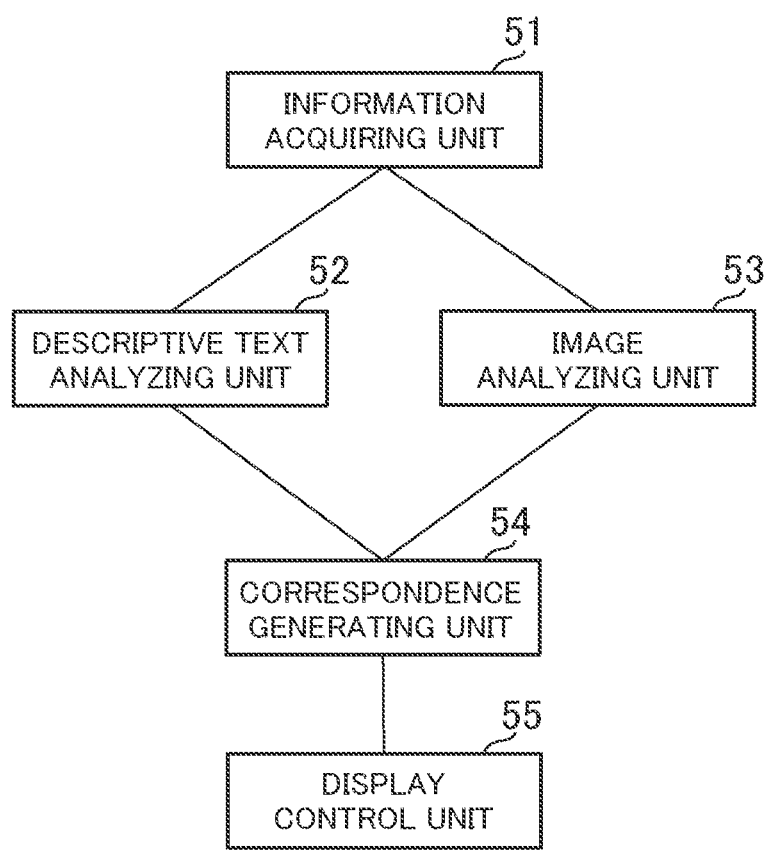
FIG. 2 is a block diagram for illustrating functions implemented by the information processing system.

Next, functions provided by the information processing system are described. FIG. 2 is a block diagram for illustrating functions implemented by the information processing system. The information processing system includes an information acquiring unit 51, a descriptive text analyzing unit 52, an image analyzing unit 53, a correspondence generating unit 54, and a display control unit 55. Those functions are implemented when the processor 11 included in the information processing server 1 executes the programs stored in the storage 12 and controls the communication unit 13 and other components. The display control unit 55 may be implemented by a processor 11, a storage 12, a communication unit 13, and an input/output unit 14 (all not shown) included in the customer terminal 2. In this case, the display control unit 55 is implemented by the processor 11 included in the customer terminal 2 executes a program stored in the storage 12 and controls the input/output unit 14 and other components.

The information acquiring unit 51 is configured to acquire the description information including the descriptive text related to the item, and the at least one image from the customer terminal 2 operated by the user being the seller.

The at least one image relates to an item sold by the seller, and may be obtained by photographing at least one object included in the item.

The descriptive text analyzing unit 52 is configured to analyze the descriptive text included in the description information, to thereby identify an object word from the descriptive text. The descriptive text analyzing unit 52 may further identify a part word related to a part of the object from the descriptive text. The object word is a word indicating an object, and the part word is a word indicating a part of the object.

The image analyzing unit 53 is configured to detect an object from each of the at least one image. The image analyzing unit 53 may further detect a photographed portion which is a part being photographed of the object.

The correspondence generating unit 54 is configured to generate correspondence information based on correspondence between the object word identified from the descriptive text and the object detected from the image. The correspondence generating unit 54 may generate correspondence information based on correspondence between the part word of the object identified from the descriptive text and the photographed portion of the object detected from the image.

The correspondence information may be information representing a correspondence relationship between the object word identified from the descriptive text and the object detected from the image, or may be information representing an object word (or a part word) having no correspondence to any object detected from the image. Further, the correspondence information may be information representing correspondence between an object detected from the image and a sentence that is included in the descriptive text and includes an object corresponding to the detected object and being identified from the descriptive text. The term "sentence" used herein may be one sentence being a character string including one or more words and ending with a period mark, or may include a plurality of sentences.

The display control unit 55 is configured to perform control, based on the correspondence information, so that information is displayed on the customer terminal 2, to thereby present the information to the user. The information to be presented may be information for urging the seller to input an image corresponding to the object word or the part word. The object word or the part word has no correspondence to any object detected from the image. Or the information may be an item page including an image and a descriptive text, which is to be displayed for the purchase candidate. When the information to be presented is the item page, the display control unit 55 may perform control so that a sentence corresponding to an object included in an image pointed by the user being the purchase candidate is displayed.

Figure 3:
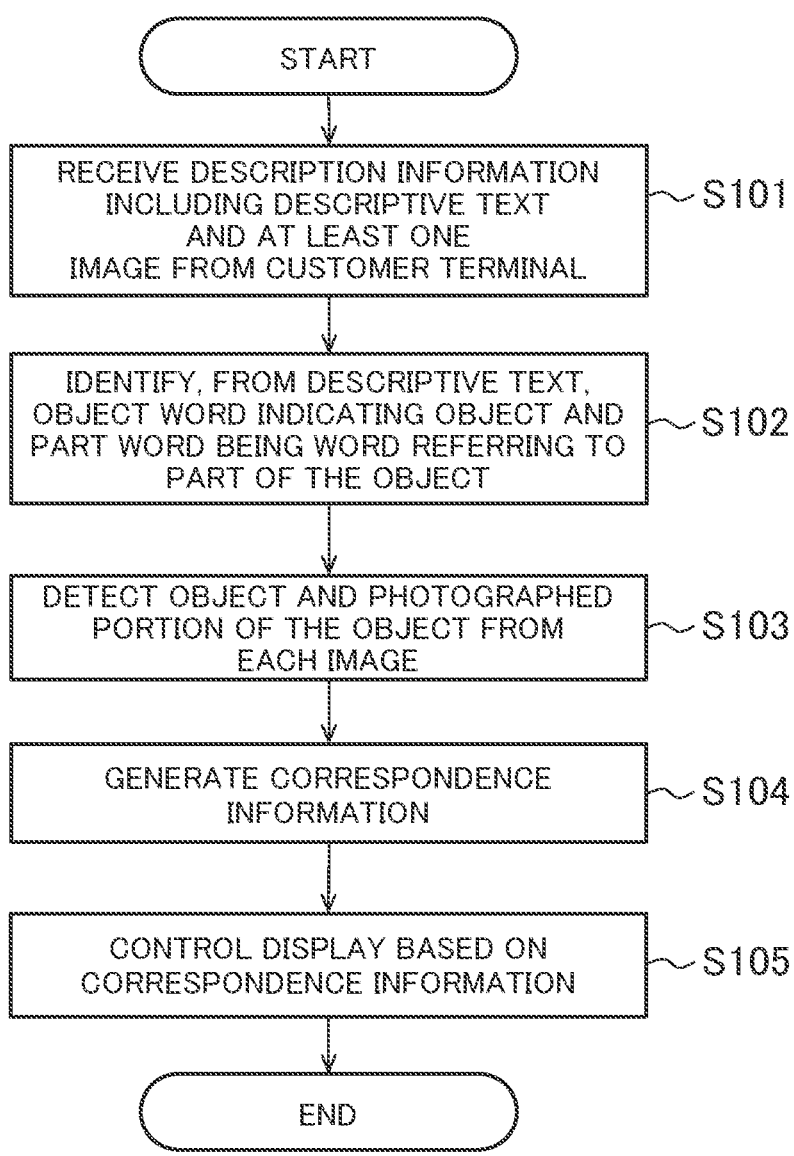
FIG. 3 is a flow chart for schematically illustrating processing of the information processing system.

FIG. 3 is a flow chart for schematically illustrating processing of the information processing system. The processing illustrated in FIG. 3 is mainly processing to be performed when the seller registers an item. First, although not shown, the customer terminal 2 outputs a screen for registering an item to be sold, and transmits a plurality of images and description information input by the user through this screen to the information processing server 1.

The information acquiring unit 51 receives description information including a descriptive text and at least one image from the customer terminal 2 (Step S101).

Figure 4:
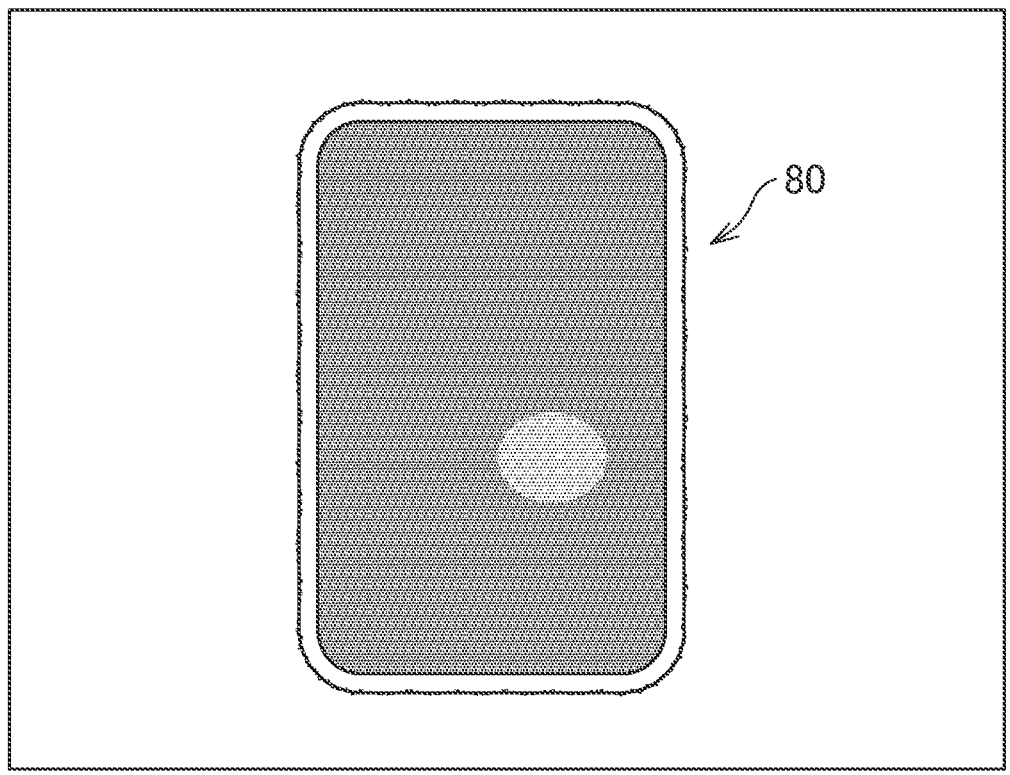
FIG. 4 is a view for illustrating an example of an image to be input.

FIG. 4 is a view for illustrating an example of the image to be input. The example of FIG. 4 shows, as the image related to the item, an image of a smartphone 80 photographed by the user. Specifically, this image includes an image of a front surface (front) of the smartphone 80.

Next, the descriptive text analyzing unit 52 identifies, from the received descriptive text, an object word being a word indicating an object and a part word being a word referring to a part of the object (Step S102). Depending on the type of the object and the description of the descriptive text, the descriptive text analyzing unit 52 may identify only the object word for at least a part of objects.

Figure 5:
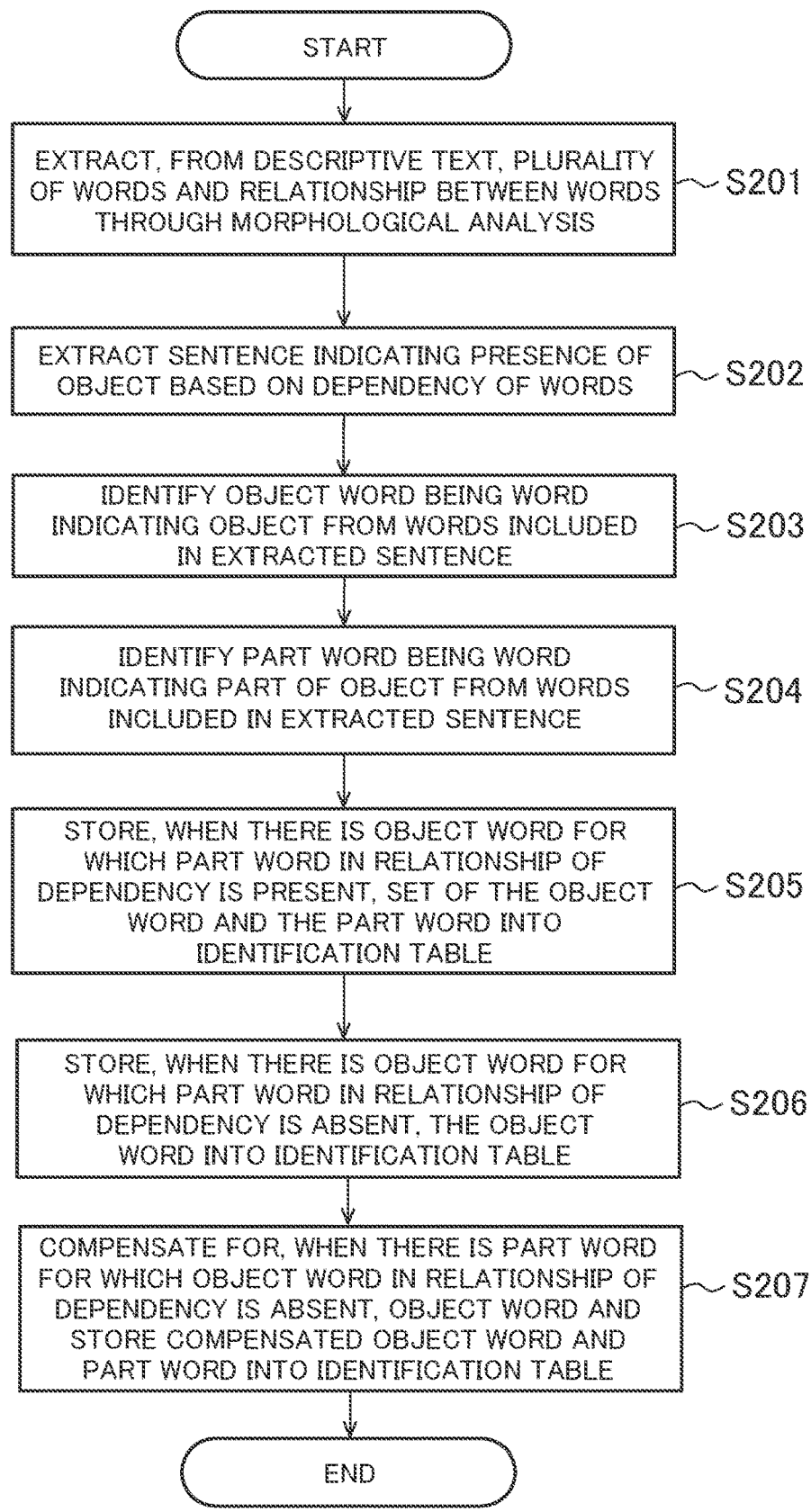
FIG. 5 is a flow chart for illustrating an example of processing of a descriptive text analyzing unit.

FIG. 5 is a flow chart for illustrating an example of processing of the descriptive text analyzing unit 52. First, the descriptive text analyzing unit 52 extracts, from the descriptive text, a plurality of words and a relationship between those words through morphological analysis and parsing (Step S201). The morphological analysis and the parsing are publicly known technologies, and hence a detailed description thereof is omitted.

The descriptive text analyzing unit 52 extracts, among sentences included in the descriptive text, a sentence indicating presence of an object, based on the dependency of the words (Step S202). For example, the descriptive text analyzing unit 52 may extract a sentence including a word or a word group (for example, "there is") indicating that an object is present, and is not required to extract a sentence including a word or a word group (for example, "there is no") indicating that an object is absent. The following processing is performed on words included in the extracted sentence.

Next, the descriptive text analyzing unit 52 identifies an object word being a word indicating an object (Step S203) and a part word being a word indicating a part of the object (Step S204) from the words included in the extracted sentence. The descriptive text analyzing unit 52 may identify, when an extracted word is any word stored in an object dictionary prepared in advance, the extracted word as the object word, and may identify, when an extracted word is any word stored in a part dictionary prepared in advance, the extracted word as the part word.

The object dictionary and the part dictionary may be manually or automatically created. For example, a noun which appears on an item page of a sales service at a high frequency or a noun having a high value of TF-IDF may be adopted as the object word or the part word. Further, various expressions having the same meaning and synonyms of the object word and the part word may be added to the object dictionary and the part dictionary. The object word may be selected in consideration of whether or not the word contributes to sales in the sales service. For example, positive data may be counted for an object word appearing in an item descriptive text for an item actually sold in the past, and negative data may be counted for an object word appearing in an item descriptive text for an item that did not sell. Then, the counting results may be used to carefully select the object word.

Then, when there is an object word for which a part word in a relationship of dependency is present, a set of the object word and the part word is registered in an identification table (Step S205). At least one set are registered in the identification table. Each of the set registered in the identification table includes an object word and a part word identified from the descriptive text by the descriptive text analyzing unit 52. For example, when only the object word is identified, the set is not required to include the part word. The identification table is stored in the storage 12. Instead of using the identification table, list data like an array may be stored in the storage 12.

On the other hand, when there is an object word for which a part word in the relationship of dependency is absent, the object word is registered in the identification table as the set (Step S206). Further, when there is a part word for which an object word in the relationship of dependency is absent, an object word is compensated for based on an item name included in the item information, and a set of the compensated object word and the part word is stored into the identification table (Step S207).

FIG. 6 is a table for showing examples of a sentence included in the descriptive text, and an object word and a part word identified from the sentence. A column of the object word and a column of the part word of FIG. 6 show examples of sets stored in the identification table.

Referring to FIG. 6, object words such as "warranty", "earphones", and "smartphone" are identified. From the first sentence, the object word "warranty" is identified, but no part word is identified. In the third sentence, "back side" is identified as the part word, but "back side" is converted into "back surface" in order to eliminate the inconsistency of words, and is stored into the identification table. The fourth sentence is in a negative form, and is not a sentence indicating presence of an object. Accordingly, even when "charge adapter" is defined in the object dictionary, no object word or part word is stored into the identification table.

The part word is a word (referring portion), which is included in the descriptive text, and refers to a part of the object indicated by the object word.

The processing in and after Step S202 performed by the descriptive text analyzing unit 52 may be implemented through use of a machine learning model. A natural language processing model called "bidirectional encoder representations from transformers (BERT)" may be used. A sentence of the descriptive text is input to the natural language processing model and the natural language processing model directly acquire a set of the object word and the part word as output, without using the morphological analysis.

While the processing of the descriptive text analyzing unit 52 is performed, the image analyzing unit 53 detects an object and a photographed portion of the object from each of the at least one received image (Step S103). What is actually detected is technically a type of the object, and the photographed portion is not required to be detected depending on the type of the object.

Specifically, a method called "region proposal" using an image recognition model based on machine learning may be used. The image analyzing unit 53 inputs an image to the image recognition model, and outputs, as detection results, an object output from the image recognition model and an area in which the object is present. As the image recognition model, Faster R-CNN, SSD, or YOLO may be used. The image analyzing unit 53 may set the object to be output as a detected object. In this case, the image recognition model is trained through use of training data including an image and an object to be detected. As the training data, for example, a general image recognition data set called "ImageNet" may be used.

The image analyzing unit 53 may acquire an orientation estimated by an orientation recognition model, and output the orientation as a detected photographed portion of the object. For the orientation estimation of the object, an orientation recognition model may be constructed for each object through use of learning data (for example, an image group of front and back surfaces of warranties) prepared in advance. As the orientation recognition model, for example, a model described in the paper "Implicit 3D Orientation Learning for 6D Object Detection from RGB Images" by Martin Sundermeyer, Zoltan-Csaba Marton, Maximilian Durner, Manuel Brucker, and Rudolph Triebel may be used. The image analyzing unit 53 may obtain a 3D model of an object, and estimate a rotation parameter "r" of the object from a similarity degree between an image generated from the 3D model and an input image. The rotation parameter "r" may be any one of a rotation vector, a rotation matrix, a quaternion, and an Euler angle. In this case, the image analyzing unit 53 may use a mapping function "f" to convert the rotation parameter "r" into any one of options (for example, front surface, back surface, and side surface) determined in advance for the photographed portion. When it is difficult to estimate the orientation of the detected object (for example, a cable), the orientation estimation processing may be skipped.

The set of the object and the photographed portion detected by the processing so far is stored in a detection result table of the storage 12 in association with the image from which the object and the photographed portion are detected. In this case, both of the object and the photographed portion may be output as detection results from the image recognition model. Further, instead of using the detection result table, list data like an array may be stored in the storage 12. In this case, the image recognition model is trained through use of training data including an image and an object and photographed portion to be detected.

FIG. 7 is a table for showing the object and the photographed portion to be detected from the image, and is a table for showing the object and the photographed portion to be registered in a list of the detection results. From an image 1, a smartphone is detected as the object, and the front is detected as the photographed portion. From an image 2, two objects of a charge adapter and a box are detected. The charge adapter has small differences depending on orientations and parts, and hence the photographed portion is not detected therefor. An image 3 is actually an image of a warranty, but the image analyzing unit detects a document as the object and the front as the photographed portion.

When the object word and the like are identified by the descriptive text analyzing unit 52, and the object and the like are detected by the image analyzing unit 53, the correspondence generating unit 54 generates correspondence information (Step S104). When the correspondence information is generated, the display control unit 55 controls the display of the customer terminal 2 based on the generated correspondence information (Step S105).

Figure 8:
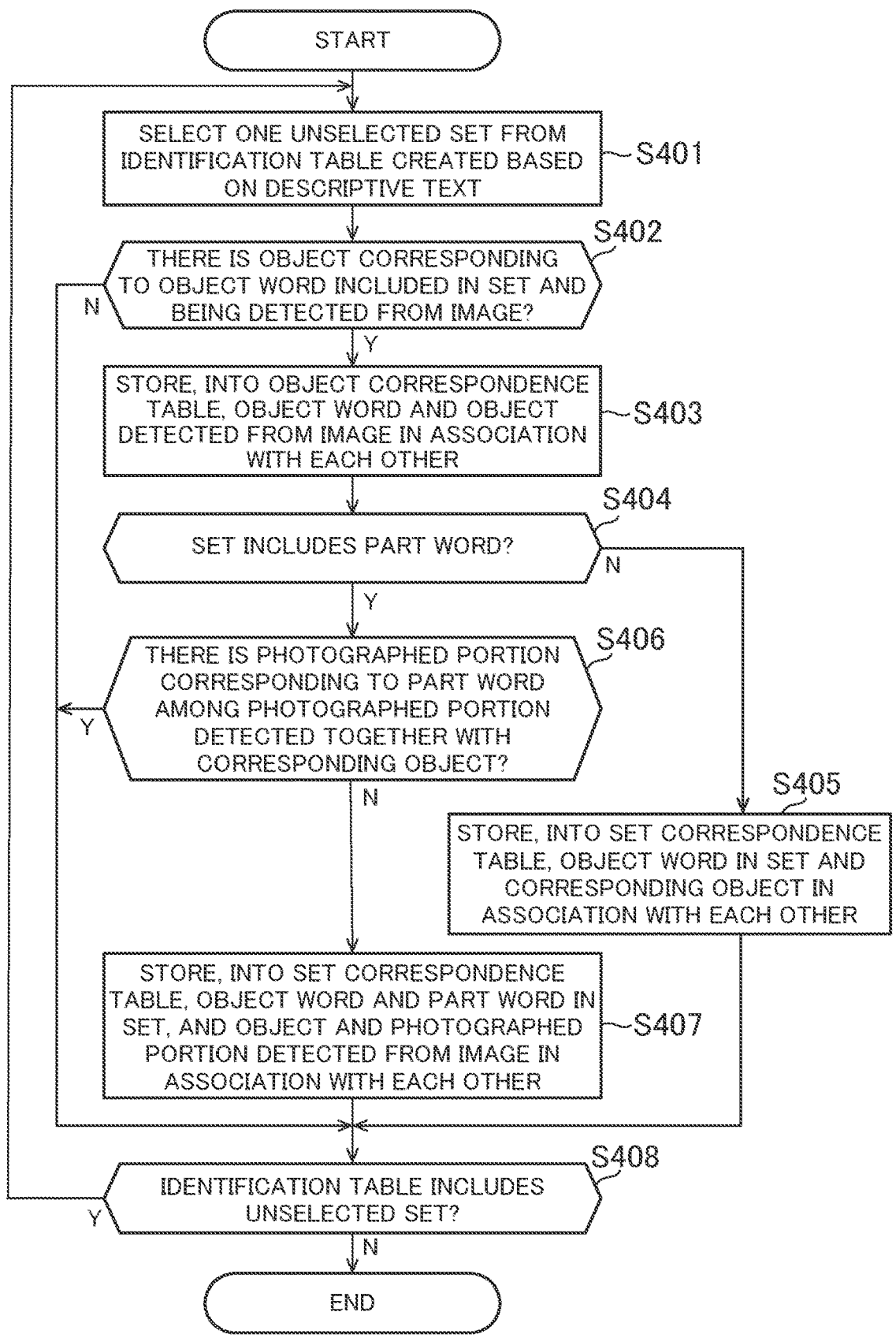
FIG. 8 is a flow chart for illustrating an example of processing of a correspondence generating unit.

Now, the processing of Step S104 is described. FIG. 8 is a flow chart for illustrating an example of the processing of the correspondence generating unit 54, and shows part of the processing of Step S104. The processing illustrated in FIG. 8 is processing of determining correspondence between the set including the object word identified from the descriptive text (set identified from the descriptive text) and the set including the object detected from the image (set detected from the image).

First, the correspondence generating unit 54 selects one unselected set from the identification table created by the descriptive text analyzing unit 52 based on the descriptive text (Step S401). The correspondence generating unit 54 searches for an object corresponding to the object word included in the selected set, from the object detected from the image (object stored as a set with the photographed portion) (Step S402). In the processing of searching for the object corresponding to the object word, more specifically, the correspondence generating unit 54 converts, based on a correspondence table prepared in advance, the object word included in the selected set into identification information for identifying the type of the object detected from the image, and searches for an object having the type of the object indicated by the identification information, from the object detected from the image.

When there is no object, being detected from the image, corresponding to the object word included in the selected set (N in Step S402), the processing for this set is ended, and the processing proceeds to Step S408. On the other hand, when there is an object, being detected from the image, corresponding to the object word included in the selected set (Y in Step S402), the correspondence generating unit 54 stores, into an object correspondence table in the storage 12, the object word and the object detected from the image in association with each other (Step S403).

Figure 9:
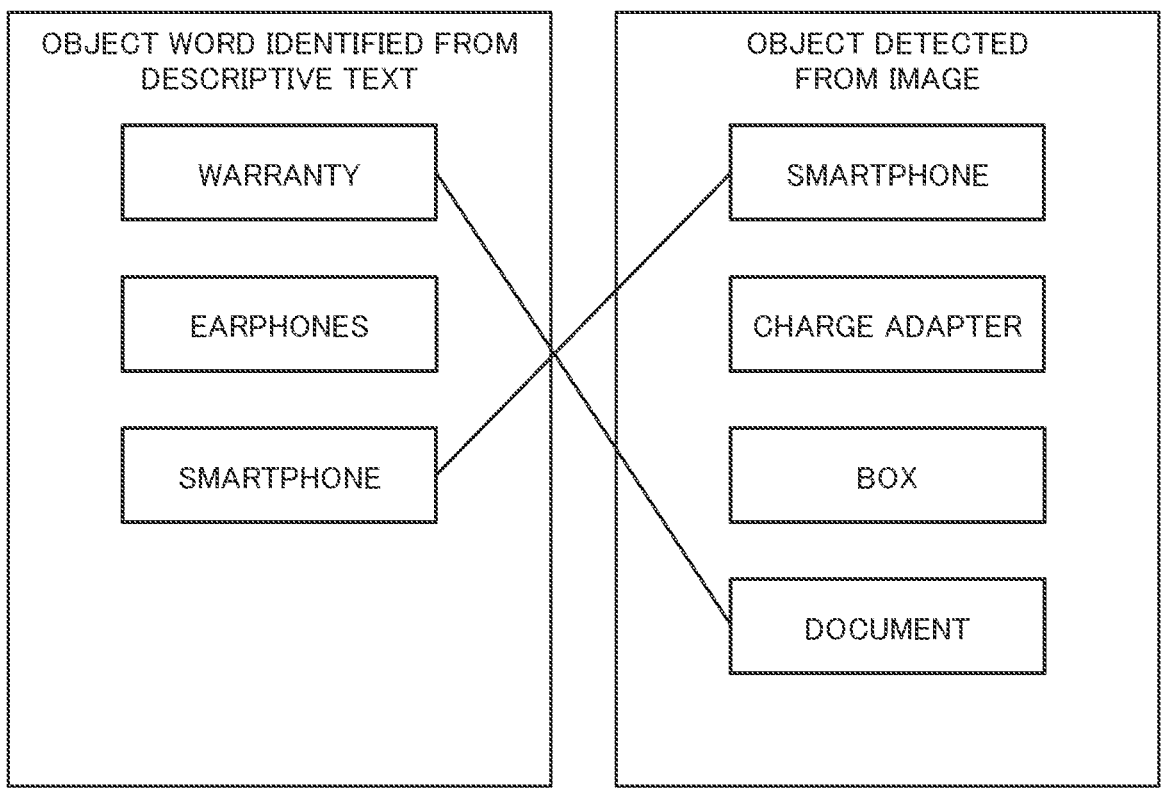
FIG. 9 is a diagram for illustrating information to be stored in an object correspondence table.

FIG. 9 is a diagram for illustrating information to be stored in the object correspondence table. In the example of FIG. 9, the "warranty" in the descriptive text and the "document" detected from the image are stored into the object correspondence table in association with each other. Further, the "smartphone" identified from the descriptive text, and the "smartphone" detected from the image and the image from which the object is detected are stored into the object correspondence table in association with each other.

Then, when the selected set includes no part word (N in Step S404), the correspondence generating unit 54 stores, into a set correspondence table in the storage 12, the object word in the set, and the corresponding object and the image from which the object is detected in association with each other (Step S405).

When the selected set includes a part word (Y in Step S404), the correspondence generating unit 54 searches for a photographed portion corresponding to the part word from the photographed portion detected together with the object as having correspondence (Step S406). When there is a photographed portion corresponding to the part word (Y in Step S406), the object word and the part word in the set, and the object and the photographed portion detected from the image are stored into the set correspondence table in association with each other (Step S407). When there is no photographed portion corresponding to the part word (N in Step S406), Step S407 is skipped.

In Step S408, the correspondence generating unit 54 determines whether or not the identification table includes an unselected set. Then, when the identification table includes an unselected set (Y in Step S408), the processing is repeated from Step S401. On the other hand, when the identification table includes no unselected set (N in Step S408), the processing of FIG. 8 is ended.

Figure 10:
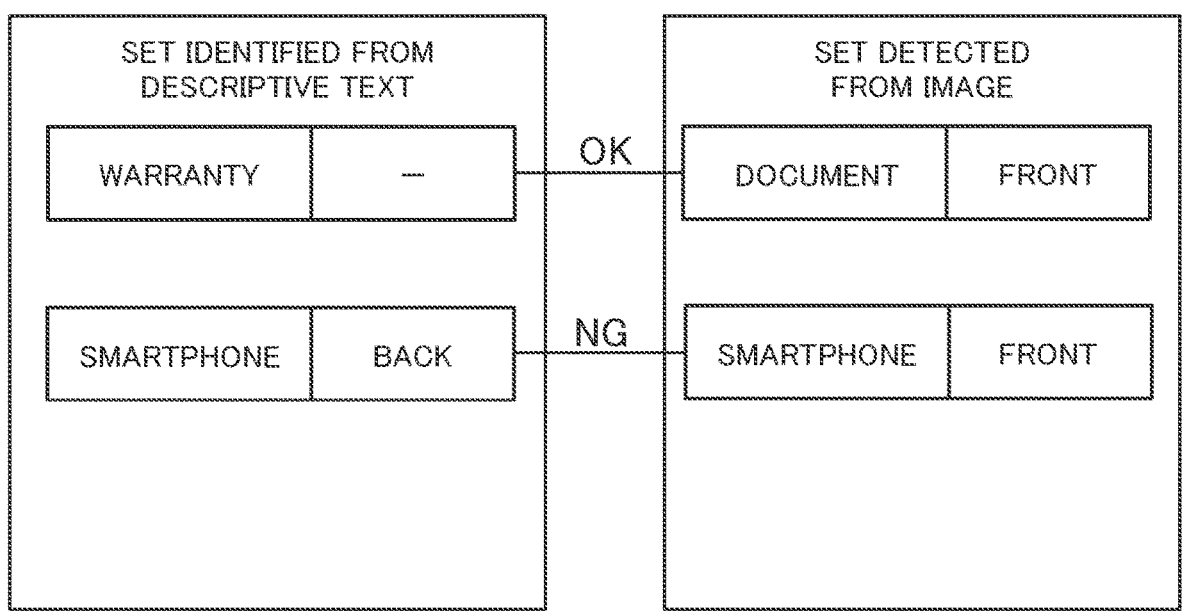
FIG. 10 is a diagram for illustrating information to be stored in a set correspondence table.

FIG. 10 is a diagram for illustrating information to be stored in the set correspondence table. In the example of FIG. 10, for "warranty" being an object extracted from the descriptive text, a part word is not identified as a set. For this reason, the set including "warranty" is regarded as having a correspondence relationship with respect to the set of "document" and "front" detected from the image irrespective of the photographed portion, and the sets are stored into the set correspondence table in association with each other. The set of "smartphone" and "back" identified from the descriptive text is determined to have no correspondence as a set with respect to the set of "smartphone" and "front" detected from the image because there is no correspondence between the part word and the photographed portion. Thus, those sets are not stored into the set correspondence table.

In this case, the association between the set identified from the descriptive text and the set detected from the image may be performed by other methods. For example, it is not required to determine, in advance, whether or not there is correspondence between a candidate of the object word identified from the descriptive text and a candidate of the type of the object identified from the image. The image analyzing unit 53 may acquire the type of the object identified from the image as a name of the object, and the correspondence generating unit 54 may calculate a distance between two points of the object word and the name of the object in a semantic space, and determine the correspondence relationship between the object word and the name of the object based on a greedy algorithm or dynamic programming. Coordinates of the object word and the name of the object in the semantic space may be determined based on, for example, publicly known writings like the enormous number of webpages on the Web.

Figure 11:
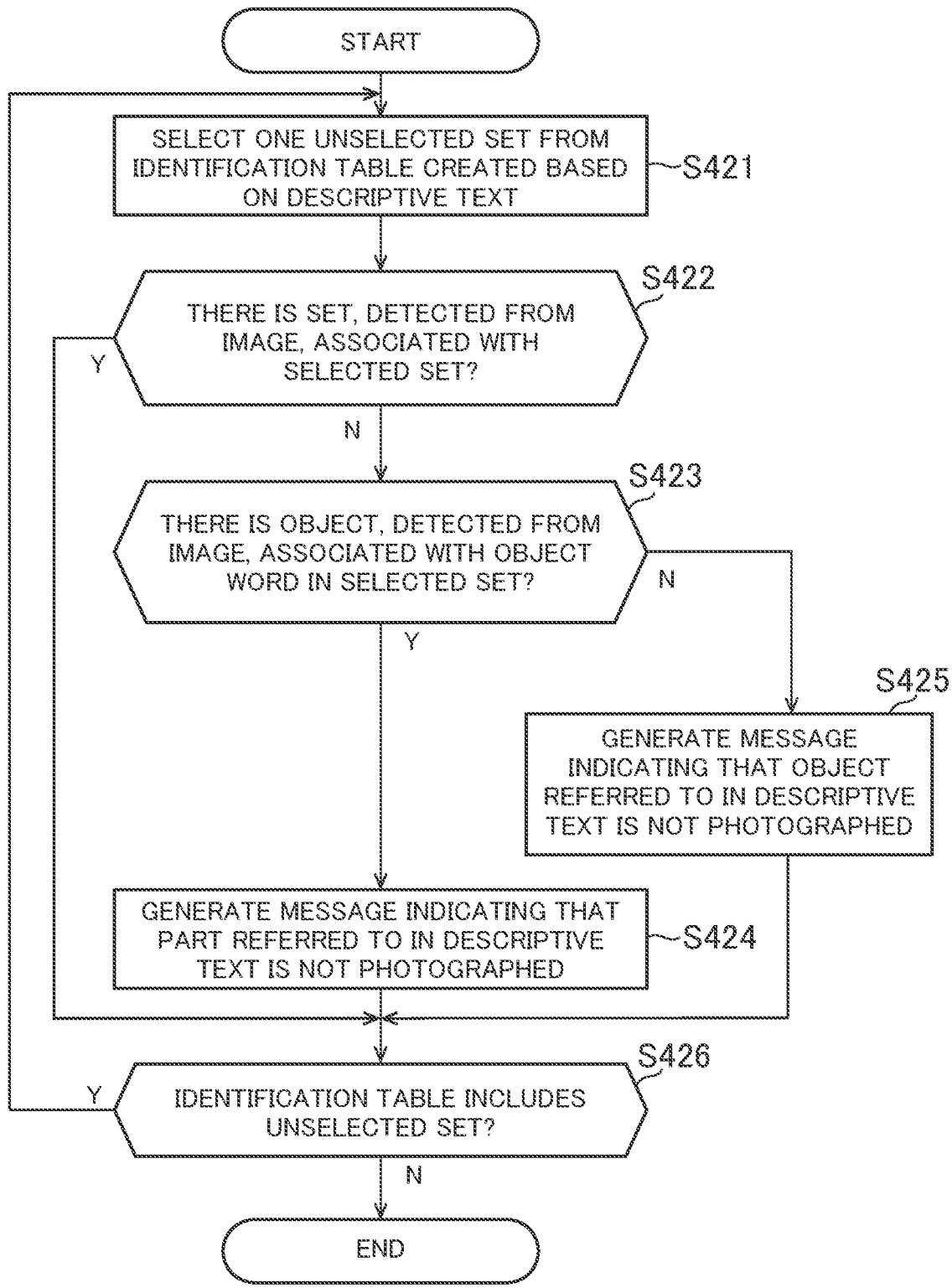
FIG. 11 is a flow chart for illustrating an example of the processing of the correspondence generating unit.

When the correspondence between the set identified from the descriptive text and the set detected from the image is determined, the correspondence generating unit 54 generates, as the correspondence information, information representing the object word or the part word being referred to in the descriptive text but having no corresponding image. FIG. 11 is a flow chart for illustrating an example of the processing of the correspondence generating unit 54.

The correspondence generating unit 54 selects one unselected set from the identification table created by the descriptive text analyzing unit 52 based on the descriptive text (Step S421). The correspondence generating unit 54 searches the set correspondence table to determine whether or not information associated with the selected set is stored, to thereby determine whether or not there is a set, detected from the image, associated with the selected set (Step S422).

When there is a set, detected from the image, associated with the selected set (Y in Step S422), the processing related to the selected set is ended, and the processing proceeds to Step S426.

When there is no set, detected from the image, associated with the selected set (N in Step S422), the correspondence generating unit 54 searches the object correspondence table to determine whether or not information associated with the object word included in the selected set is stored, to thereby determine whether or not there is an object associated with the object word included in the selected set and detected from the image (Step S423). When there is a corresponding object (Y in Step S423), the correspondence generating unit 54 generates, as the correspondence information, a message indicating that the object corresponding to the object word of the descriptive text is photographed, but the part referred to in the descriptive text (part corresponding to the part word) is not photographed (Step S424).

On the other hand, when there is no corresponding object (N in Step S423), the correspondence generating unit 54 generates, as the correspondence information, a message indicating that the object referred to in the descriptive text (object corresponding to the object word) is not photographed (Step S425).

Then, in Step S426, the correspondence generating unit 54 determines whether or not the identification table includes an unselected set. Then, when the identification table includes an unselected set (Y in Step S426), the processing is repeated from Step S421. On the other hand, when the identification table includes no unselected set (N in Step S426), the processing of FIG. 11 is ended.

FIG. 12 is a view for illustrating examples of a message to be generated. FIG. 12 shows examples of a message to be generated based on the data illustrated in FIG. 9 and FIG. 10. The message is generated as a type of notification for urging the user to add an image. As for the object word "earphones"

identified from the descriptive text, there is no object detected from the image and associated with "earphones". Thus, no object is detected, and a message for urging the user to photograph the earphones is generated. Meanwhile, as for the object word "smartphone" identified from the descriptive text, there is a corresponding object detected from the image, but the part word and the photographed portion do not correspond to each other. Thus, a message for urging the user to photograph the part indicated by the part word is generated.

When the processing illustrated in FIG. 11 is executed, in a case in which a message is generated, in Step S105, the display control unit 55 performs control so that the generated message is displayed on the customer terminal 2. Specifically, the display control unit 55 controls the display by transmitting display data including the message to the customer terminal 2. Further, the display control unit 55 may simply transmit the correspondence information representing the lacked object or part to the customer terminal 2, and the customer terminal may generate the message from the correspondence information to output the message. Further, the generation of the message may be performed on the customer terminal 2 side as the display control unit 55. The seller operating the customer terminal 2 transmits an additional image from the customer terminal 2, and the information acquiring unit 51 acquires the image. After that, the information processing system may execute the processing in and after Step S102 of FIG. 3.

As described above, a message indicating the object word or the part word being referred to in the descriptive text but having no corresponding image is generated and displayed. Thus, the seller can easily know that the description of the descriptive text and the image have inconsistency, and can easily solve this inconsistency. In this manner, the consistency between the descriptive text and the image can be ensured, and the user can more easily grasp the item from the descriptive text and the image.

In this case, as the correspondence information, information like the set correspondence table or the object correspondence table may be generated, or information representing association between an image and a sentence included in a descriptive text may be generated.

Figure 13:
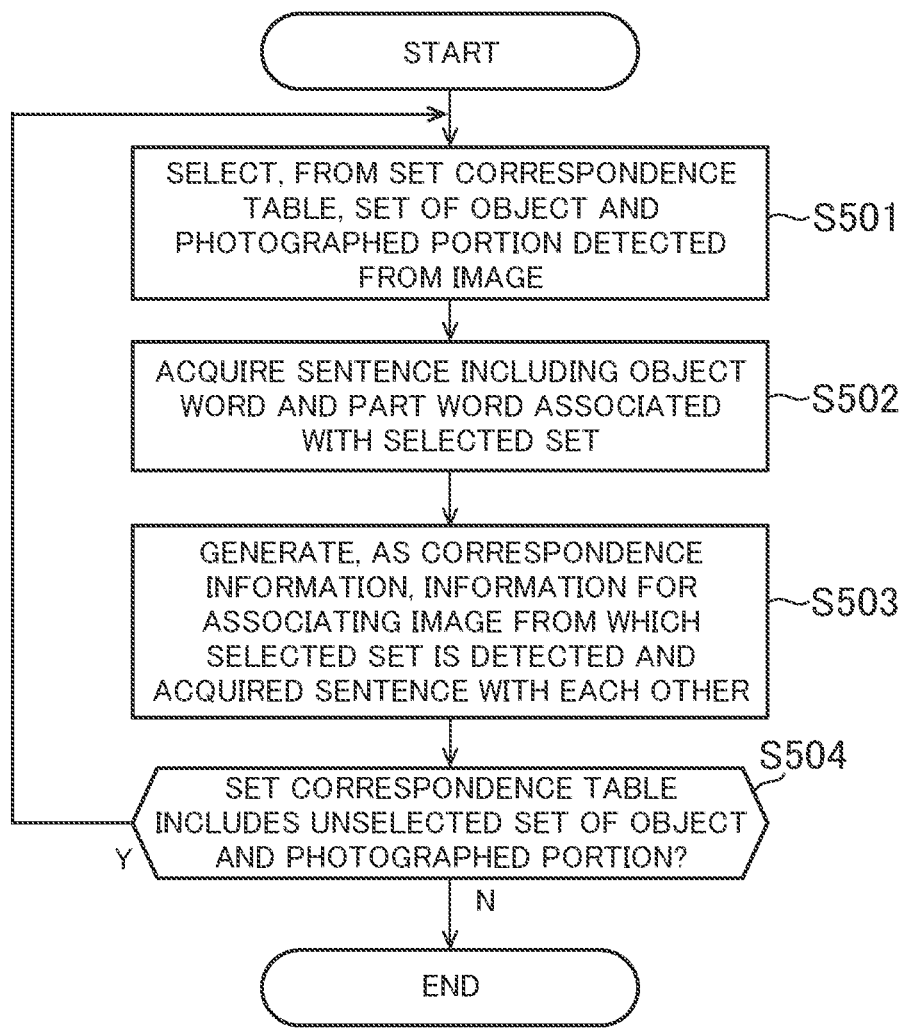
FIG. 13 is a flow chart for illustrating another example of the processing of the correspondence generating unit.

FIG. 13 is a flow chart for illustrating another example of the processing of the correspondence generating unit 54, and is a flow chart for illustrating processing to be executed after the processing illustrated in FIG. 8 in place of or in parallel to the processing illustrated in FIG. 11.

In the processing illustrated in FIG. 13, the correspondence generating unit 54 selects, from the set correspondence table, the set of the object and the photographed portion detected from the image (Step S501). The correspondence generating unit 54 acquires a set, identified from the descriptive text, associated with the selected set, and acquires a sentence including the object word and the part word included in the set (Step S502). This sentence is a sentence included in the descriptive text, and the correspondence generating unit 54 may acquire the sentence by searching for and extracting the sentence including the object word and the part word from the descriptive text. As another example, the descriptive text analyzing unit 52 may store in advance, in the storage 12, a set of an object word and a part word and a sentence from which the set is identified in association with each other, and the correspondence generating unit 54 may acquire the sentence stored in association with the set of the object word and the part word. As a matter of course, even when only an object word is stored in a set identified from the descriptive text, the correspondence generating unit 54 may acquire a sentence from which the object word is identified.

When the sentence is acquired, the correspondence generating unit 54 generates, as the correspondence information, information for associating, with the acquired sentence each other, the image from which the selected set is detected (Step S503). Then, when the set correspondence table includes an unselected set detected from the image (Y in Step S504), the correspondence generating unit 54 repeats the processing from Step S501. On the other hand, when the set correspondence table includes no unselected set detected from the image (N in Step S504), the processing of FIG. 13 is ended.

With the processing illustrated in FIG. 13, an image from which an object or a photographed portion is detected, and a sentence from which an object word or a part word corresponding to the object or the photographed portion is identified are associated with each other.

Figure 14:
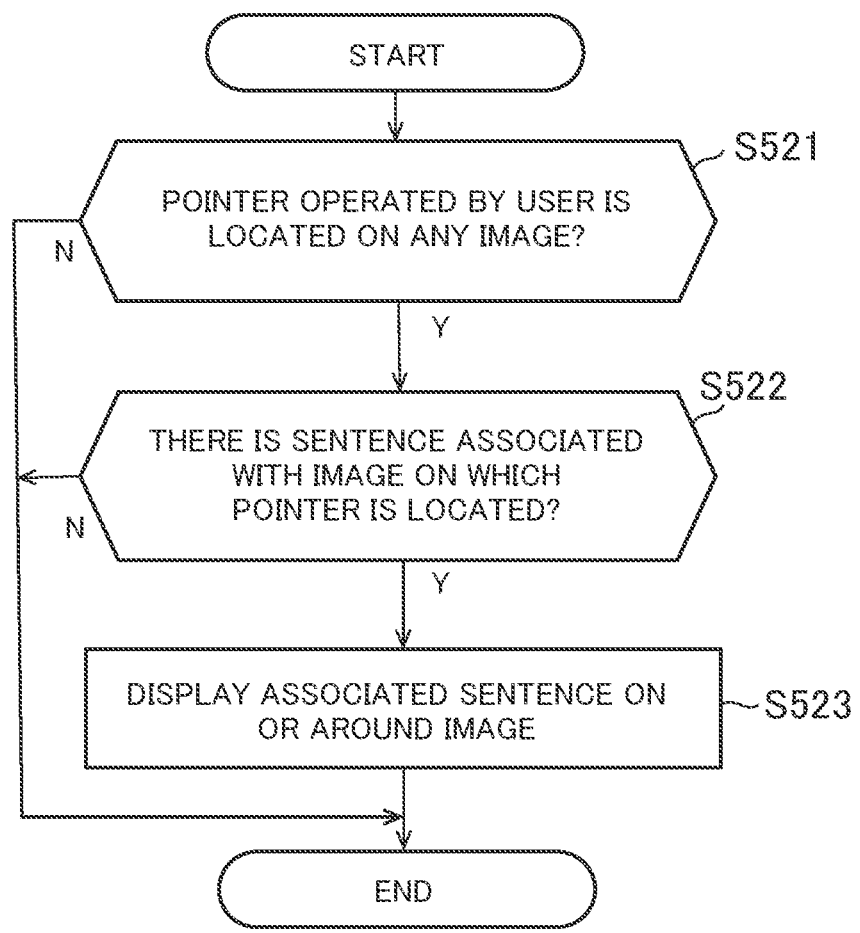
FIG. 14 is a flow chart for illustrating another example of processing of a display control unit.

Now, display control using the correspondence information is described. FIG. 14 is a flow chart for illustrating another example of the processing of the display control unit 55. The processing illustrated in FIG. 14 is processing to be performed when an item description page including an image is displayed on the customer terminal 2 in response to an operation performed by the user being the purchase candidate. And the processing is executed by the customer terminal 2 which has received the correspondence information together with the item description page.

First, the display control unit 55 determines whether or not a pointer operated by the user is located on any image (Step S521). The pointer is used to display a position pointed by the user on a user interface. When the pointer is located on the image (Y in Step S521), the display control unit 55 determines whether or not there is an associated sentence based on the correspondence information (Step S522). When there is an associated sentence (Y in Step S522), the display control unit 55 displays the associated sentence on or around the image (Step S523).

Figure 15:
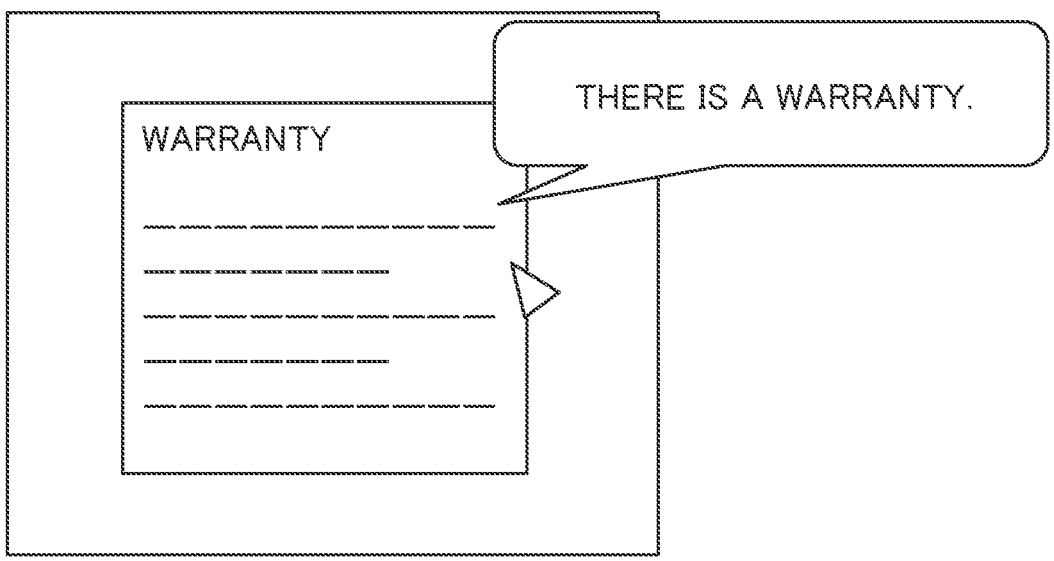
FIG. 15 is a view for illustrating an example of a sentence to be output when a pointer is located on an image.

FIG. 15 is a view for illustrating an example of the sentence to be output when the pointer is located on the image. The pointer illustrated in FIG. 15 is a so-called mouse pointer, and FIG. 15 shows an example of a case in which the customer terminal 2 is a personal computer. As described above, when a descriptive text corresponding to the image on which the pointer is located is displayed, the sentence corresponding to the image can be easily recognized, and the item can be easily understood.

In this case, the correspondence generating unit 54 may generate, as the correspondence information, information for associating, in place of an image itself, an area of the image from which an object is identified, and a descriptive text with each other. In this case, the display control unit 55 may display the associated sentence on or around the image only when the pointer is located in the area of the image included in the correspondence information.

While there have been described what are at present considered to be certain embodiments of the invention, it will be understood that various modifications may be made thereto, and it is intended that the appended claims cover all such modifications as fall within the true spirit and scope of the invention.

What is claimed is:

1. An information processing system configured to provide an electronic commerce platform, the information processing system comprising:
   at least one processor; and at least one memory device that stores a plurality of instructions which, when executed by the at least one processor, causes the at least one processor to:
acquire a descriptive text related to an item and at least one image related to the item;
identify an object word from the descriptive text;
detect a detected object from each of the at least one image using a first machine learning model;
generate correspondence information based on correspondence between the object word and the detected object;
wherein the first machine learning model is configured to use a region proposal method and output an object and an area in image where the object is present;
identify the object word from the descriptive text using a second machine learning model;
wherein the second machine learning model is configured to identify the object word using a natural language processing model;
wherein a sentence of the descriptive text is input into the second machine learning model and a set of object words are output;
identify a plurality of object words from the descriptive text;
identify, from the descriptive text, a plurality of referring portions related to a part of a plurality of object indicated by the plurality of object words;
convert a first referring part among of the plurality of referring parts related to a first object indicated by the plurality of object words based on a second referring part among the plurality of referring parts related to a second object indicated by the plurality of objects;
wherein the first referring part is converted to achieve consistency in words between the first referring part and the second referring part; and
store the converted first referring part in associated with the first object.

2. The information processing system according to claim 1, wherein the plurality of instructions cause the at least one processor to generate the correspondence information including information representing, among objects identified from the descriptive text, an object having no correspondence to any object detected from the image.

3. The information processing system according to claim 2, wherein the plurality of instructions cause the at least one processor to command that a notification for urging a user to add an image is displayed, based on the correspondence information.

4. The information processing system according to claim 1, wherein the plurality of instructions cause the at least one processor to:
generate the correspondence information representing correspondence between a second detected object detected from the image and a sentence, which is included in the descriptive text, and which includes an object corresponding to the second detected object and being identified from the descriptive text, and
command that the sentence corresponding to the second detected object included in an image pointed by a user is displayed, based on the correspondence information.

5. The information processing system according to claim 4, wherein the plurality of instructions cause the at least one processor to command that the sentence corresponding to the second detected object pointed by the user in the image is displayed.

6. An information processing system configured to provide an electronic commerce platform, the information processing system comprising:

at least one processor; and
at least one memory device that stores a plurality of instructions which, when executed by the at least one processor, causes the at least one processor to:
acquire a descriptive text related to an item and at least one image related to the item;
identify an object word from the descriptive text;
detect a detected object from each of the at least one image using a first machine learning model;
generate correspondence information based on correspondence between the object word and the detected object;
wherein the first machine learning model is configured to use a region proposal method and output an object and an area in image where the object is present;
acquire an orientation of the detected object using a second machine learning model;
wherein the second machine learning model is configured to estimate an orientation of the object using an orientation recognition model constructed for each detected object through use of prepared learning data;
wherein the second machine learning model estimates the orientation of the object by:
obtaining a three-dimensional model of the object,
estimating a rotation parameter from a similarity degree between an image generated from the three-dimensional model and one of the at least one images;
wherein the rotation parameter is a rotation vector, a rotation matrix, a quaternion, or an Euler angle;
using a mapping function to convert the rotation parameter into one of a plurality of predetermined orientation options.

7. The information processing system according to claim 6, wherein the plurality of instructions cause the at least one processor to:
identify, from the descriptive text, a referring portion related to a part of an object indicated by the object word,
detect the object indicated by the object word and a photographed portion of the object indicated by the object word from each of the at least one image, and
generate the correspondence information based on correspondence between the referring portion and the photographed portion.

8. The information processing system according to claim 7, wherein the plurality of instructions cause the at least one processor to generate the correspondence information including information representing, among referring portions of objects identified from the descriptive text, a referring portion having no correspondence to any photographed portion of the object detected from the image.

9. The information processing system according to claim 6, wherein the plurality of instructions cause the at least one processor to generate the correspondence information including information representing, among objects identified from the descriptive text, an object having no correspondence to any object detected from the image.

10. The information processing system according to claim 9, wherein the plurality of instructions cause the at least one processor to command that a notification for urging a user to add an image is displayed, based on the correspondence information.

11. The information processing system according to claim 6, wherein the plurality of instructions cause the at least one processor to:
generate the correspondence information representing correspondence between a second detected object detected from the image and a sentence, which is included in the descriptive text, and which includes an object corresponding to the second detected object and being identified from the descriptive text, and command that the sentence corresponding to the second detected object included in an image pointed by a user is displayed, based on the correspondence information.

12. The information processing system according to claim 11, wherein the plurality of instructions cause the at least one processor to command that the sentence corresponding to the second detected object pointed by the user in the image is displayed.

\* \* \* \* \*